(12) United States Patent
Tsay

(10) Patent No.: US 7,641,162 B2
(45) Date of Patent: Jan. 5, 2010

(54) ADJUSTABLE SUPPORT ARM ASSEMBLY

(76) Inventor: Wen-Feng Tsay, P.O.Box 24-108, Taipei (TW)

( * ) Notice: Subject to any disclaimer, the term of this patent is extended or adjusted under 35 U.S.C. 154(b) by 47 days.

(21) Appl. No.: 12/001,945

(22) Filed: Dec. 14, 2007

(65) Prior Publication Data

US 2009/0152411 A1   Jun. 18, 2009

(51) Int. Cl.
*E04G 3/00* (2006.01)
(52) U.S. Cl. .................. 248/284.1; 248/921; 248/923
(58) Field of Classification Search ............. 248/276.1, 248/278.1, 284.1, 919, 921–923
See application file for complete search history.

(56) References Cited

U.S. PATENT DOCUMENTS

| | | | | |
|---|---|---|---|---|
| 5,738,322 A * | 4/1998 | Huang | ...................... | 248/278.1 |
| 5,853,158 A * | 12/1998 | Riggle | ...................... | 248/311.2 |
| 6,244,553 B1 * | 6/2001 | Wang | ...................... | 248/278.1 |
| 6,427,959 B1 * | 8/2002 | Kalis et al. | ............. | 248/288.11 |
| 6,669,155 B2 * | 12/2003 | Ron | ........................ | 248/276.1 |
| 2006/0131467 A1 * | 6/2006 | Wang | ...................... | 248/276.1 |
| 2006/0237608 A1 * | 10/2006 | Hanson et al. | ........... | 248/276.1 |

* cited by examiner

*Primary Examiner*—Amy J Sterling
*Assistant Examiner*—Steven M Marsh

(57) ABSTRACT

An adjustable support arm assembly includes a holder frame affixed to a support, a mounting frame for supporting an object, and a coupling structure coupled between the holder frame and the mounting frame. The coupling structure comprises a female coupling member, a male coupling member inserted into the female coupling member, a polygonal shaft with a peripherally toothed head inserted through the female coupling member and the male coupling member and movable between a locking position to lock the female coupling member to the male coupling member and an unlocking position for allowing turning of the female coupling member about the polygonal shaft relative to the male coupling member, and a compression spring that supports the polygonal shaft in the locking position.

4 Claims, 7 Drawing Sheets

ADJUSTABLE SUPPORT ARM ASSEMBLY

BACKGROUND OF THE INVENTION

1. Field of the Invention

The present invention relates to a support arm assembly and more particularly, to an adjustable support arm assembly, which allows easy adjustment of the tilt angle.

2. Description of the Related Art

A bracket or support arm assembly may be used and installed in a wall to hold a LCD TV, LCD monitor, satellite antenna, lighting fixture, video camera, advertising board, furniture, tool, etc. Conventional brackets or support arm assemblies for supporting an object on a wall do not allow the user to adjust the tilt angle of the object supported thereon. There are adjustable support arm assemblies that allow adjustment of the tilt angle of the object supported thereon. However, the adjustment procedure is complicated.

SUMMARY OF THE INVENTION

The present invention has been accomplished under the circumstances in view. It is the main object of the present invention to provide an adjustable support arm assembly that allows easy adjustment of the tilt angle of the object supported thereon.

According to the present invention, the adjustable support arm assembly comprises a holder frame affixed to a support, a mounting frame for supporting an object, a link, and two coupling structures respectively coupling two distal ends of the link to the holder frame and the mounting frame. Each coupling structure comprises a female coupling member, a male coupling member, a polygonal shaft, a cap, and a compression spring. The female coupling member comprises two circular coupling holes axially aligned, and a toothed portion extending around one end of the circular coupling holes. The male coupling member comprises a transversely extending polygonal coupling hole disposed between the two circular coupling holes of the female coupling member. The polygonal shaft is inserted through the circular coupling holes of the female coupling member and fitted into the polygonal coupling hole of the male coupling member, having a peripherally toothed head movable with the polygonal shaft between a locking position where the peripherally toothed head is engaged with the toothed portion of the female coupling member to lock the female coupling member to the male coupling member and an unlocking position where the peripherally toothed head is disengaged from the toothed portion of the female coupling member for allowing turning of the female coupling member about the polygonal shaft relative to the male coupling member. The cap is fixedly connected to one end of the polygonal shaft opposite to the peripherally toothed head. The compression spring is mounted on the polygonal shaft and stopped between the cap and the female coupling member to support the polygonal shaft in the locking position.

DETAILED DESCRIPTION OF THE PREFERRED EMBODIMENT

Referring to the annexed drawings in detail, an adjustable support arm assembly in accordance with the present invention is shown comprised of a holder frame 1, a link 2, and a mounting frame 3.

Figure 1:
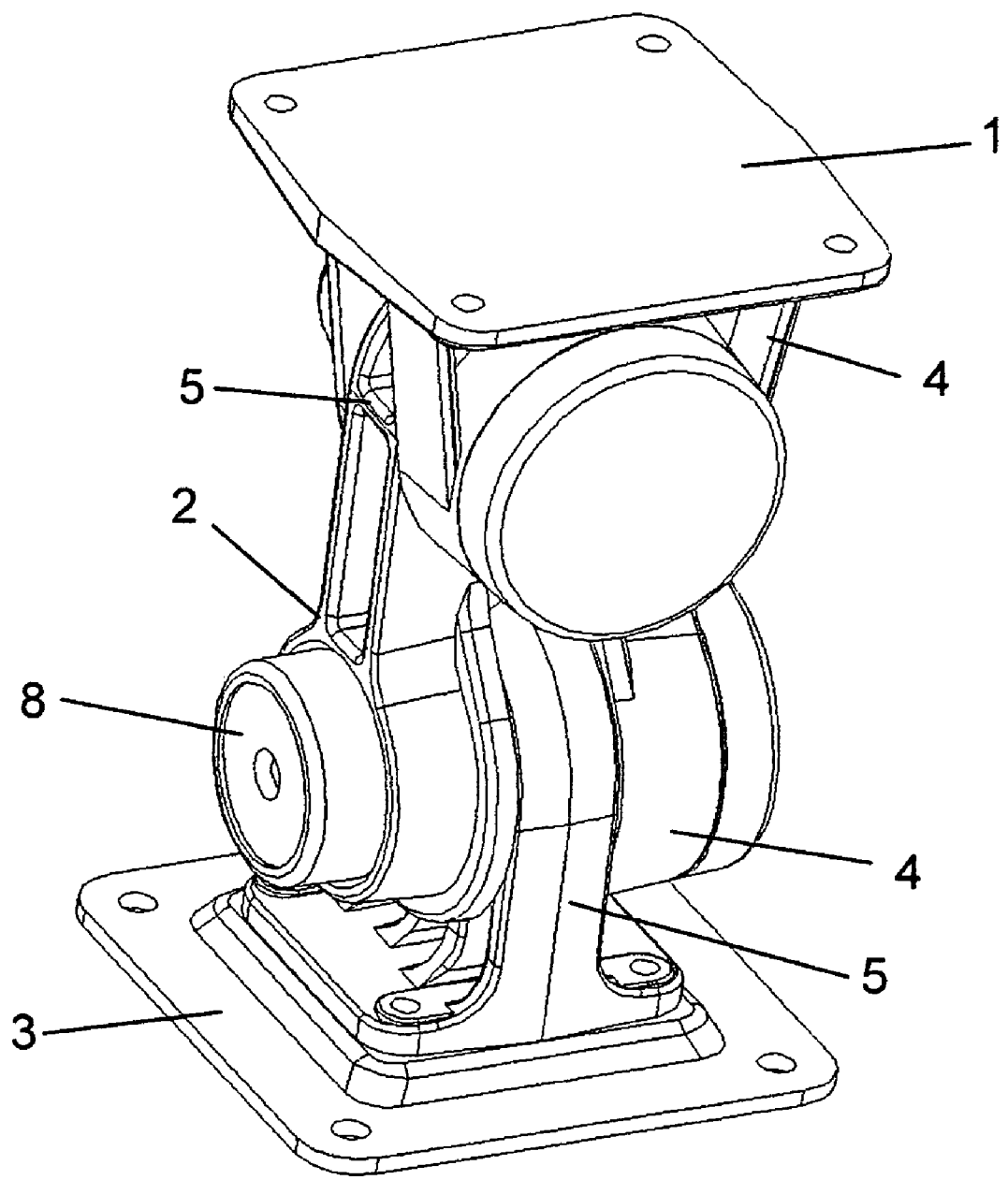
FIG. 1 is an elevational view of an adjustable support arm assembly according to the present invention.
Figure 2:
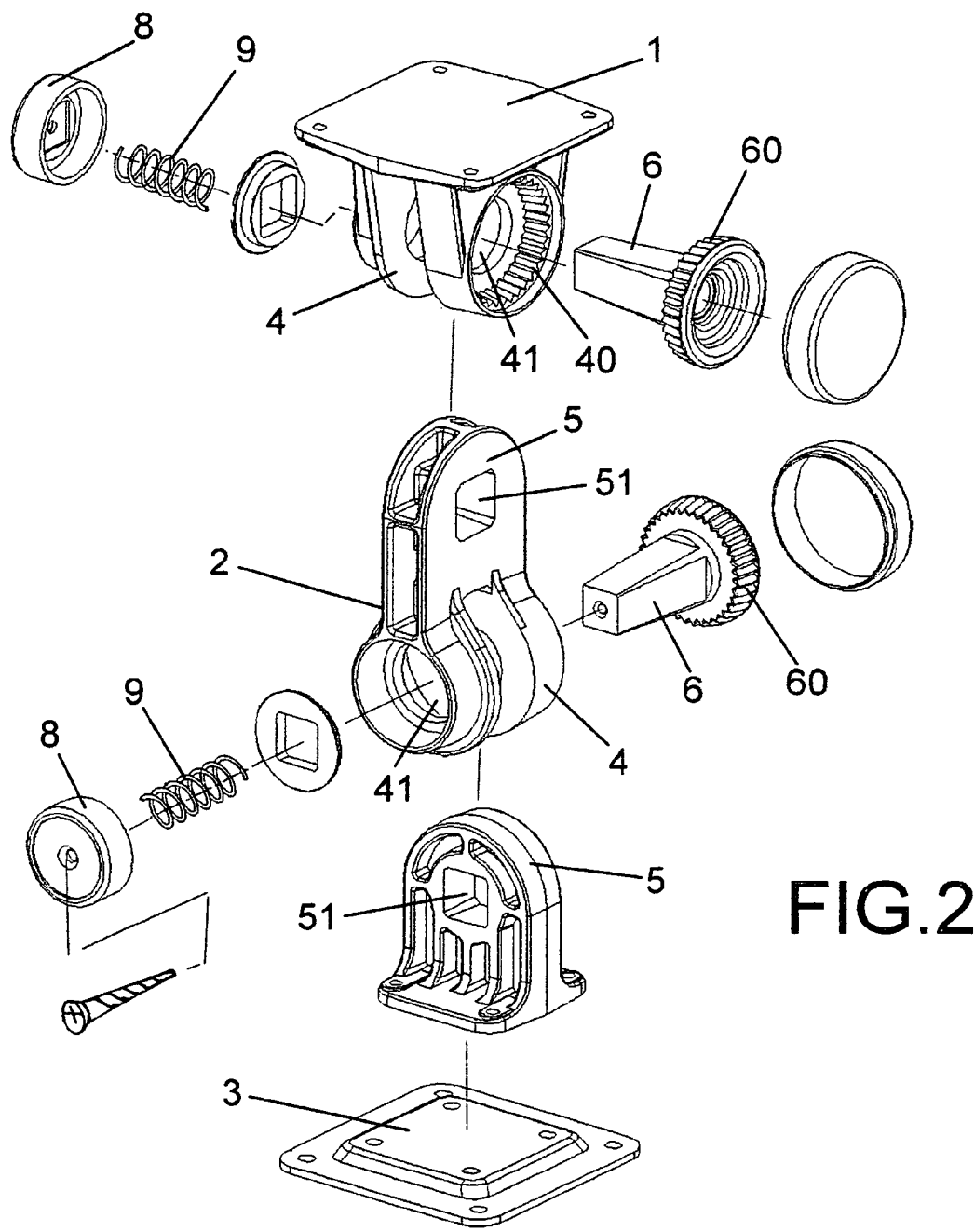
FIG. 2 is an exploded view of the adjustable support arm assembly shown in FIG. 1.
Figure 3:
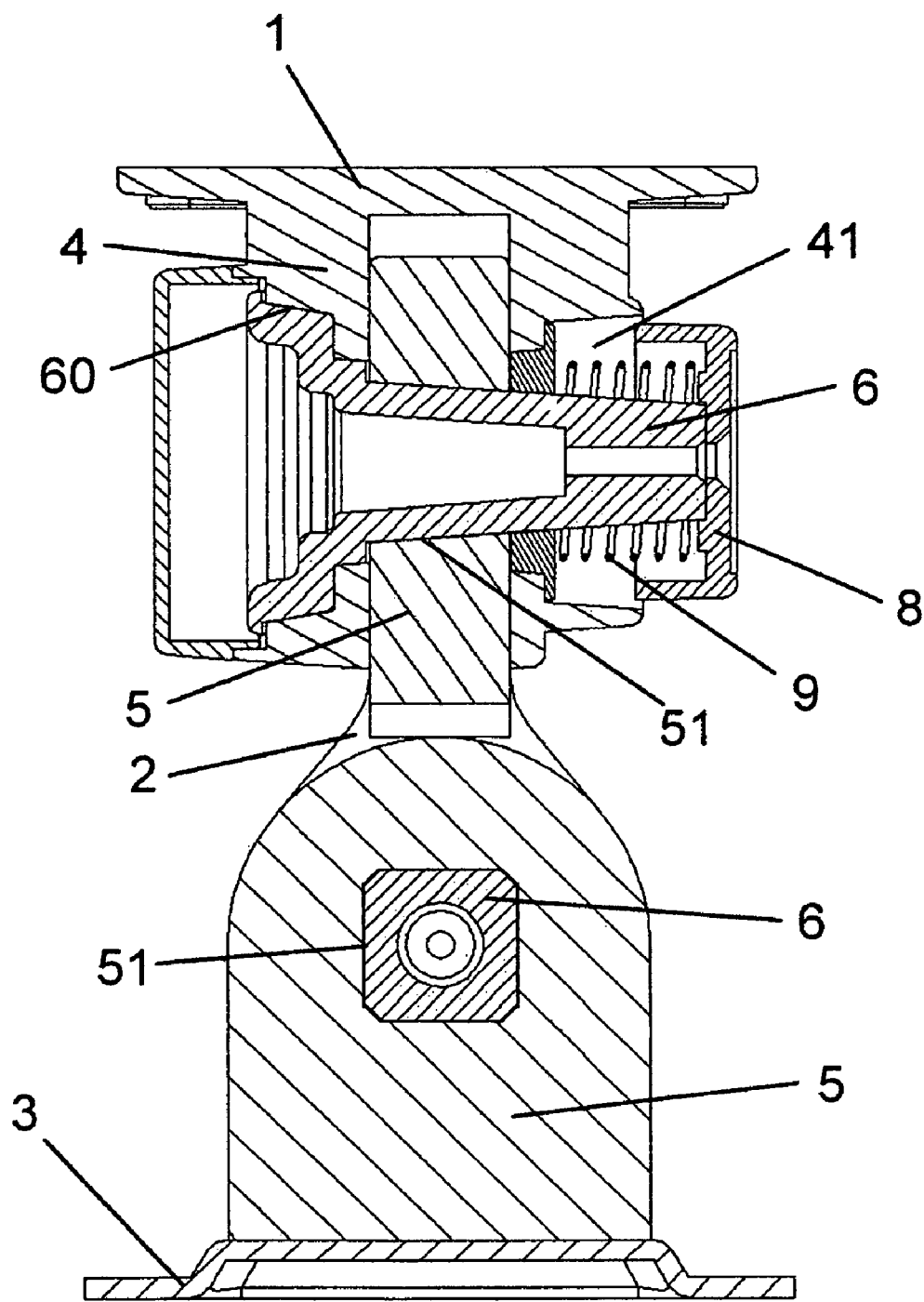
FIG. 3 is a sectional view in an enlarged scale of FIG. 1.
Figure 4:
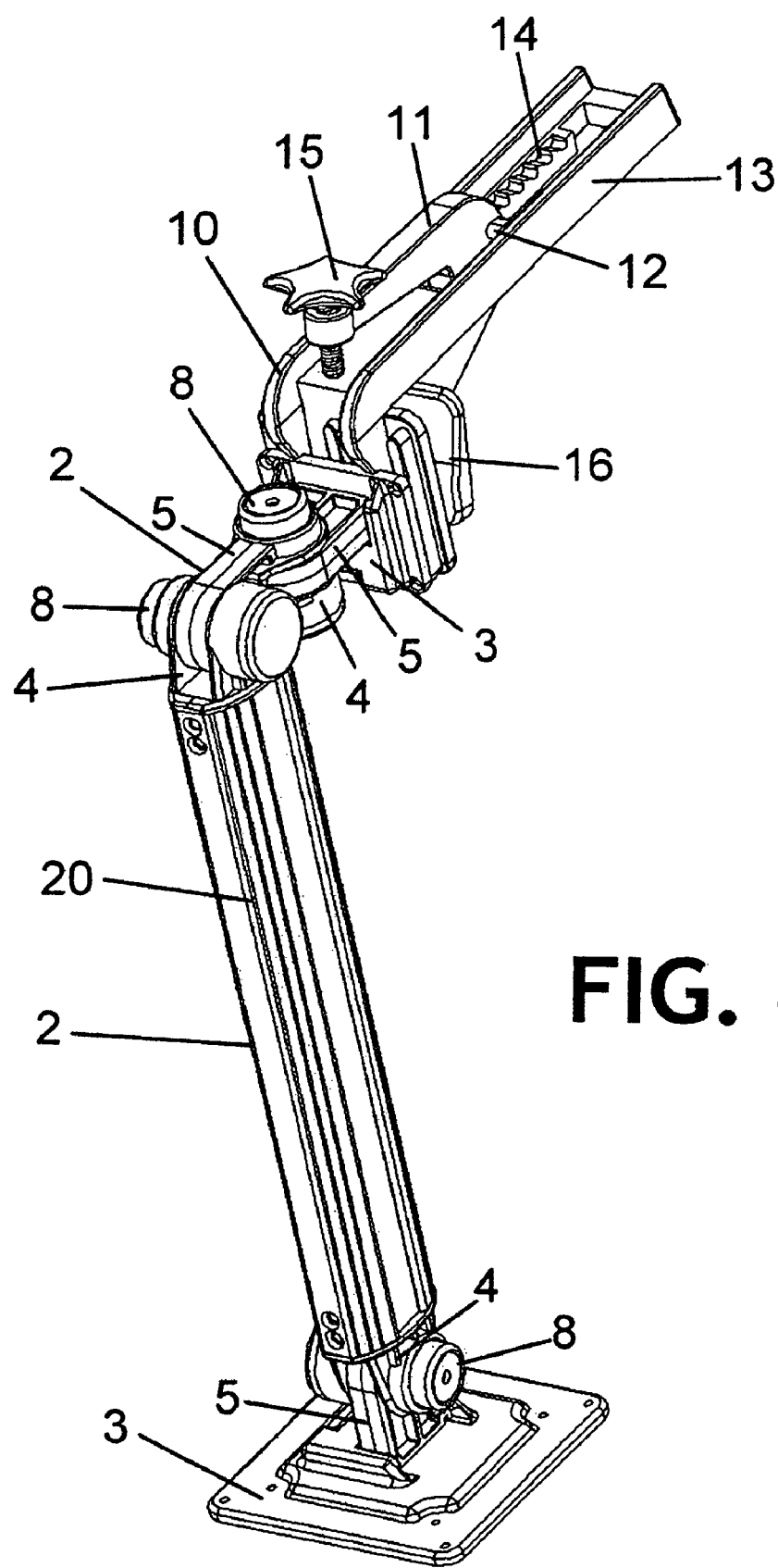
FIG. 4 is an elevational view of an alternate form of the adjustable support arm assembly according to the present invention.
Figure 5:
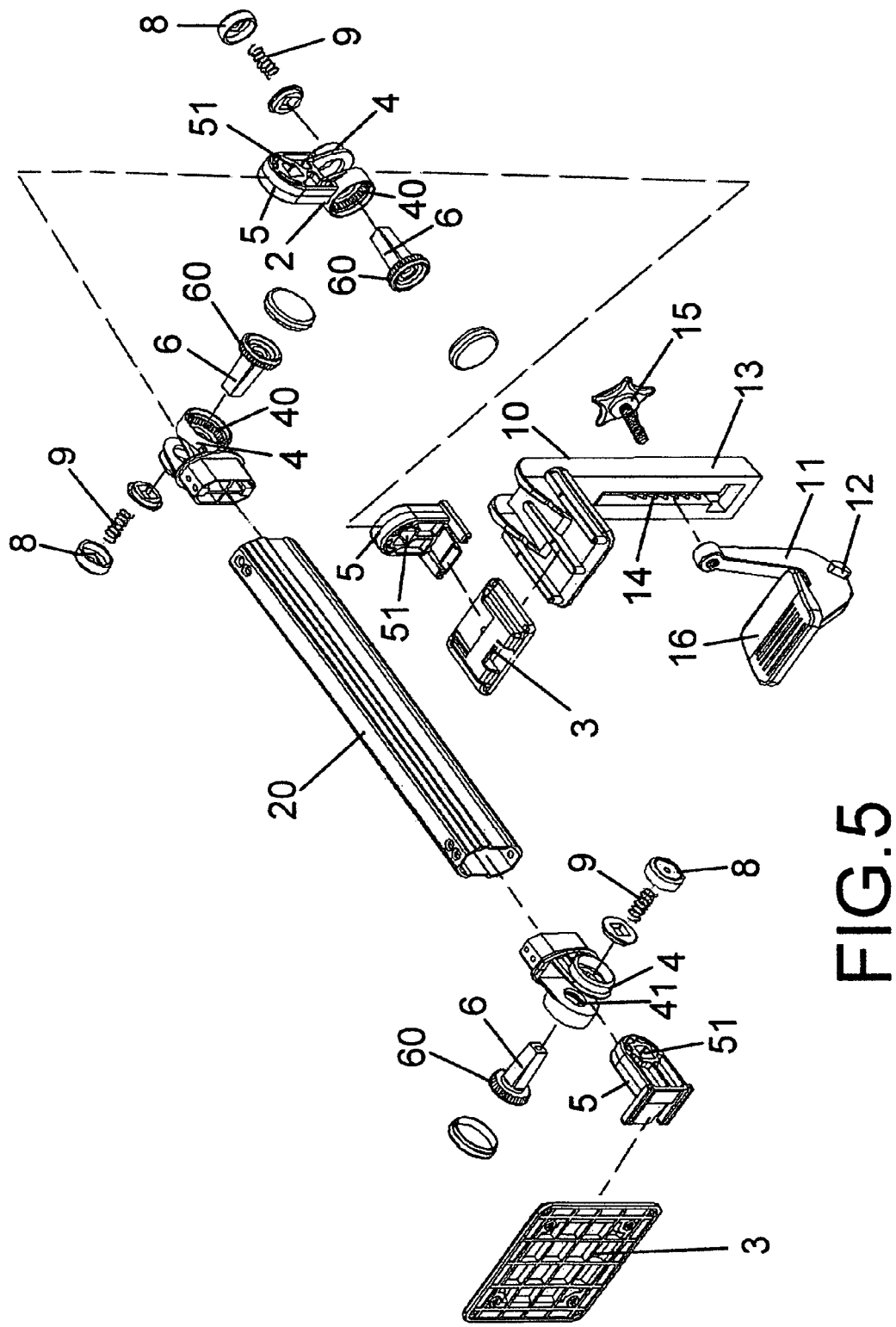
FIG. 5 is an exploded view of the adjustable support arm assembly shown in FIG. 4.
Figure 6:
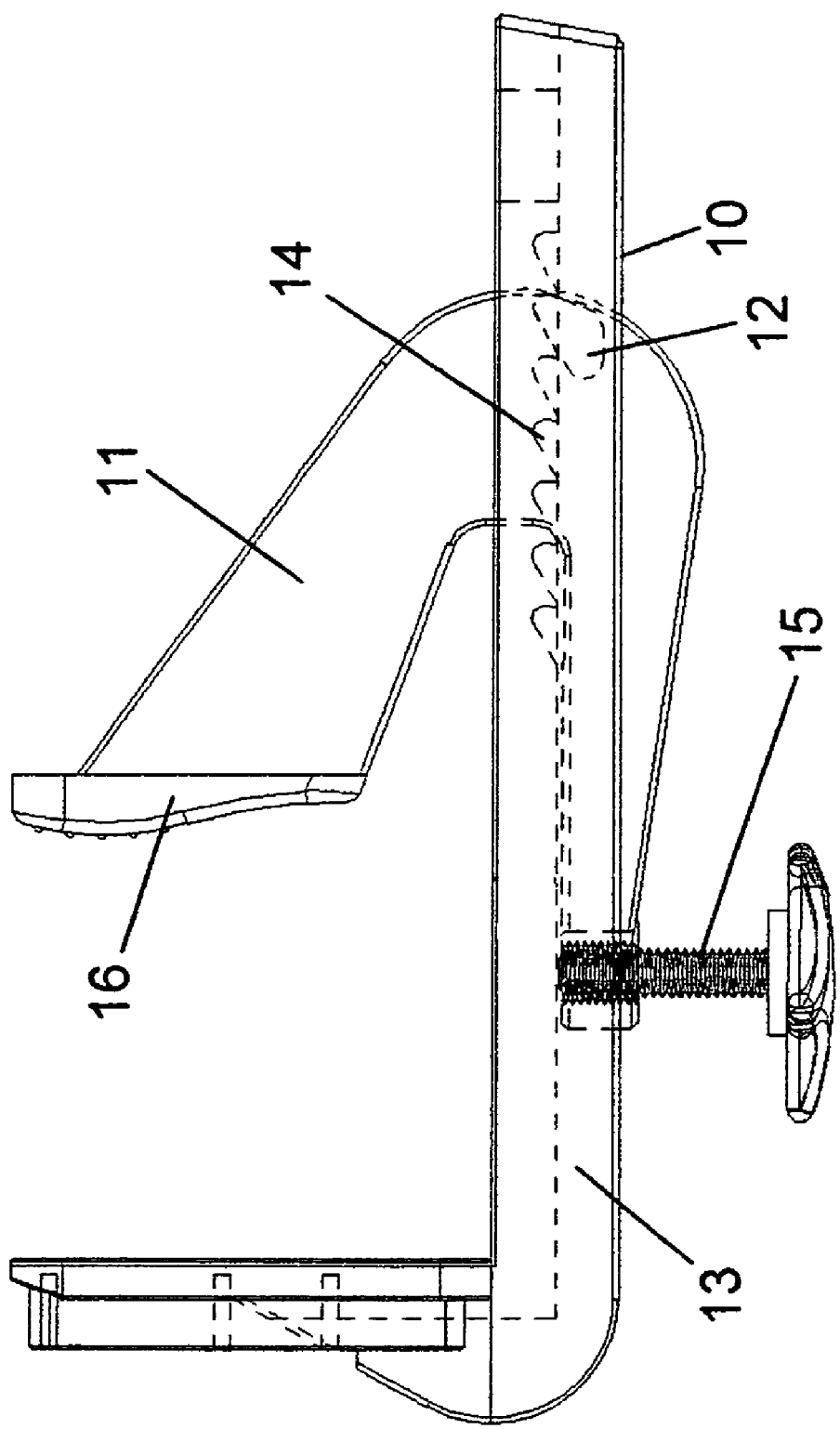
FIG. 6 is a schematic sectional view of a clamping assembly for the adjustable support arm assembly according to the present invention.
Figure 7:
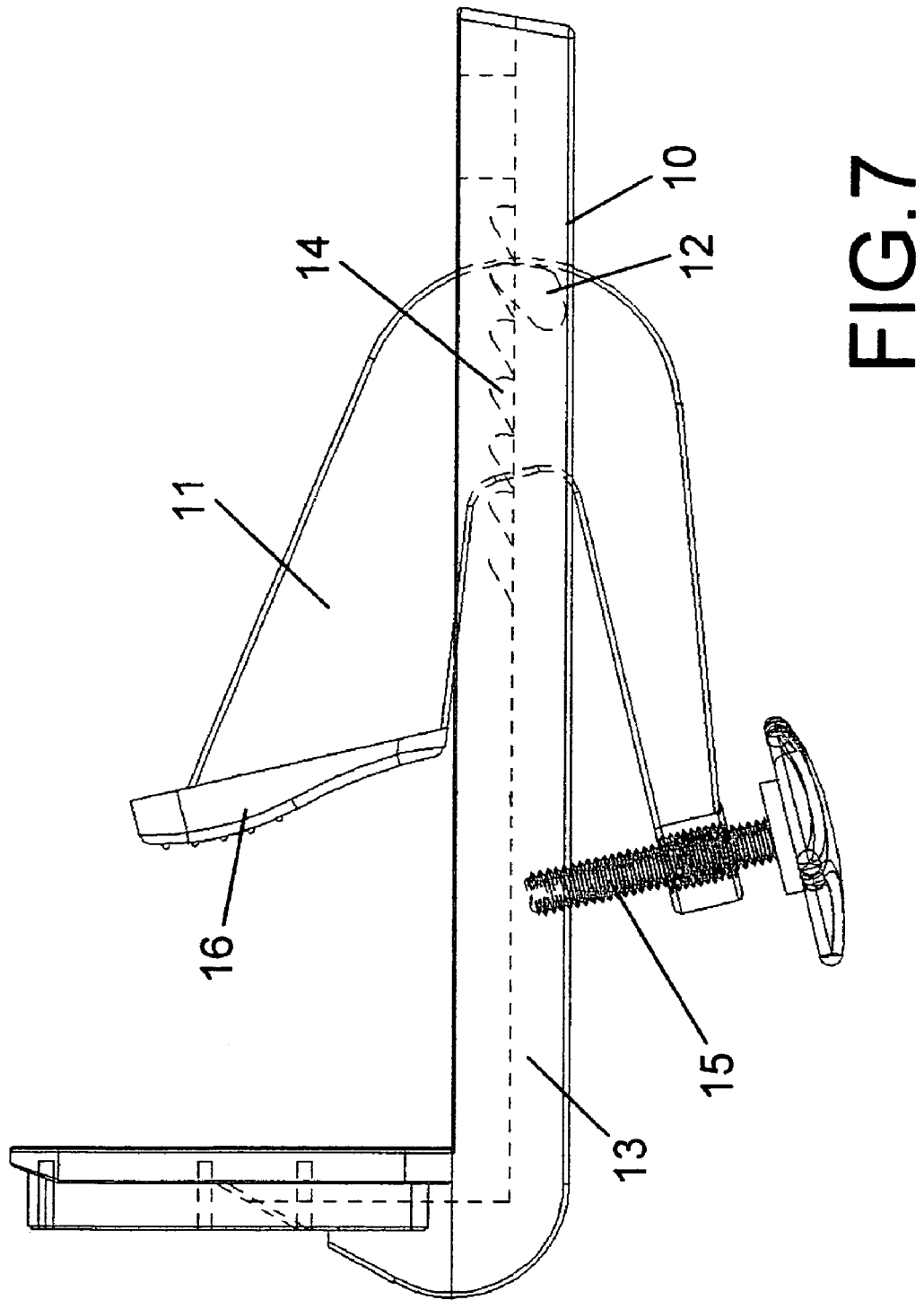
FIG. 7 corresponds to FIG. 6, showing the position of the clamping plate adjusted.

The holder frame 1 is adapted to support a LCD TV, LCD monitor, satellite antenna, lighting fixture, video camera, advertising board, furniture, tool, etc. The mounting frame 3 is for fastening to a wall panel or support means. The link 2 can be formed of one single bar or a number of support arms coupled together for connection between the holder frame 1 and the mounting frame 3. Male coupling members 5 and female coupling members 4 are respectively provided at the two distal ends of the link 2 and the bottom side of the holder frame 1 and the top side of the mounting frame 3. According to the embodiment shown in FIGS. 1~3, a female coupling member 4 is respectively provided at the bottom side of the holder frame 1 and the bottom end of the link 2, and a male coupling member 5 is respectively provided at the top side of the mounting frame 3 and the top end of the link 2. According to the embodiment shown in FIGS. 4 and 5, one female coupling member 4 and one male coupling member 5 are respectively provided at the two distal ends of the shell 20 to construct a long link 2. One male coupling member 5 is connectable to one associating female coupling member 4. After insertion of the male coupling member 5 into the associating female coupling member 4, a polygonal shaft 6 is inserted through the aligned and transversely extending circular coupling holes 41 of the female coupling member 4 and the transversely extending polygonal coupling hole 51 of the male coupling member 5 to pivotally secure the female coupling member 4 to the associating male coupling member 5. The polygonal shaft 6 has one end fixedly provided with a peripherally toothed head 60 for engaging a toothed portion 40 in the female coupling member 4 to lock the female coupling member 4 to the associating male coupling member 5, and the other end fixedly mounted with a cap 8. Further, a compression spring 9 is mounted on the polygonal shaft 6 and stopped between the female coupling member 4 and the cap 8 to impart an outward pressure to the cap 8, causing the cap 8 to pull the polygonal shaft 6 in direction toward the inside of the female coupling member 4, and therefore the peripherally toothed head 60 is kept in engagement with the toothed portion 40 of the female coupling member 4.

Further, a mounting assembly 10 may be provided at the top side of the holder frame 1 for mounting. As shown in FIGS. 4~7, the mounting assembly 10 comprises a mounting shaft 13 having a peripherally toothed mounting slot 14, a clamping plate 11 inserted through and movable along the peripherally toothed mounting slot 14 and having an engagement block 12 for engaging the toothed portion of the peripherally toothed mounting slot 14, and a lock screw 15 mounted in the clamping plate 11 for locking the clamping plate 11 to the mounting shaft 13.

During application, the mounting frame 3 is affixed to a wall panel, and the object to be supported is mounted on the holder frame 1 or fastened to the mounting assembly 10 at the holder frame 1. When adjusting the tilt angle of the supported object, hold the supported object with one hand and then press the cap 8 against the compression spring 9 with the other hand to disengage the peripherally toothed head 60 from the toothed portion 40 of the female coupling member 4, and then move the supported object to the desired angle. After adjustment, release the hand from the cap 8, and the spring force of the compression spring 9 immediately forces the peripherally toothed head 60 into engagement with the toothed portion 40 of the female coupling member 4 again.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An adjustable support arm assembly comprising:
   a holder frame affixed to a support;
   a mounting frame for supporting an object,
   a link, and
   two coupling structures respectively coupling two distal ends of said link to said holder frame and said mounting frame, said coupling structures each comprising:
   a female coupling member, said female coupling member comprising two circular coupling holes axially aligned and a toothed portion extending around one end of said circular coupling holes;
   a male coupling member, said male coupling member comprising a transversely extending polygonal coupling hole disposed between the two circular coupling holes of said female coupling member;
   a polygonal shaft inserted through the circular coupling holes of said female coupling member and fitted into the polygonal coupling hole of said male coupling member, said polygonal shaft having a peripherally toothed head movable with said polygonal shaft between a locking position where said peripherally toothed head is engaged with the toothed portion of said female coupling member to lock said female coupling member to said male coupling member and an unlocking position where said peripherally toothed head is disengaged from the toothed portion of said female coupling member for allowing turning of said female coupling member about said polygonal shaft relative to said male coupling member;
   a cap fixedly connected to one end of said polygonal shaft opposite to said peripherally toothed head; and
   a compression spring mounted on said polygonal shaft and stopped between said cap and said female coupling member to support said polygonal shaft in said locking position.

2. The adjustable support arm assembly as claimed in claim 1, further comprising a mounting assembly provided at a top side of said mounting frame for securing the object to be supported.

3. The adjustable support arm assembly as claimed in claim 1, wherein said link is comprised of a plurality of support arms connected in series.

4. An adjustable support arm assembly comprising:
   a holder frame affixed to a support;
   a mounting frame for supporting an object, and
   a coupling structure coupled between said holder frame and said mounting frame, said coupling structure comprising:
   a female coupling member, said female coupling member comprising two circular coupling holes axially aligned and a toothed portion extending around one end of said circular coupling holes;
   a male coupling member, said male coupling member comprising a transversely extending polygonal coupling hole disposed between the two circular coupling holes of said female coupling member;
   a polygonal shaft inserted through the circular coupling holes of said female coupling member and fitted into the polygonal coupling hole of said male coupling member, said polygonal shaft having a peripherally toothed head movable with said polygonal shaft between a locking position where said peripherally toothed head is engaged with the toothed portion of said female coupling member to lock said female coupling member to said male coupling member and an unlocking position where said peripherally toothed head is disengaged from the toothed portion of said female coupling member for allowing turning of said female coupling member about said polygonal shaft relative to said male coupling member;
   a cap fixedly connected to one end of said polygonal shaft opposite to said peripherally toothed head; and
   a compression spring mounted on said polygonal shaft and stopped between said cap and said female coupling member to support said polygonal shaft in said locking position.

\* \* \* \* \*